United States Patent [19]
Noda et al.

[11] Patent Number: 5,696,368
[45] Date of Patent: Dec. 9, 1997

[54] METHOD OF AND APPARATUS FOR RECORDING AND REPRODUCING OPTICAL INFORMATION

[75] Inventors: Kazuo Noda, Yokohama; Koichi Yamazaki, Sakado; Hiroaki Yoshida, Hatoyama, all of Japan

[73] Assignee: Nippon Conlux Co., Ltd., Japan

[21] Appl. No.: 572,084

[22] Filed: Dec. 14, 1995

[30] Foreign Application Priority Data

Dec. 19, 1994 [JP] Japan ............... 6-334903

[51] Int. Cl.⁶ ........................... G11B 7/08
[52] U.S. Cl. ............... 235/454; 235/455; 235/474
[58] Field of Search ........................ 235/454, 455, 235/474

[56] References Cited

U.S. PATENT DOCUMENTS 5,336,872  8/1994  Horiguchi .................. 235/474
5,426,627  6/1995  Saito ........................ 369/54

FOREIGN PATENT DOCUMENTS 5-3662  1/1993  Japan .

Primary Examiner—F. L. Evans
Attorney, Agent, or Firm—Graham & James LLP

[57] ABSTRACT

In an optical information recording and reproducing apparatus, information is recorded or reproduced by moving a recording medium relative to an optical head. In order to execute information recording onto the medium in the course of the relative movement involving acceleration and deceleration, the generation timing and intensity of a light beam to be generated in correspondence with the information to be recorded are controlled in response to a varying speed of the relative movement so that data pits to be formed in the recording medium can be standardized in pitch and size irrespective of the relative movement speed. Also, in order to permit information reproduction from the medium in the course of the relative movement involving acceleration and deceleration, reproduction timing of data read by the optical head is set in synchronism with variation in the relative movement speed so that the data can be reproduced at proper timing irrespective of the relative movement speed. With such arrangements, there can be achieved a highly increased information recording/reproduction speed, extended information recording area, reduced size and cost of the apparatus, and reduced power consumption in the apparatus.

25 Claims, 5 Drawing Sheets

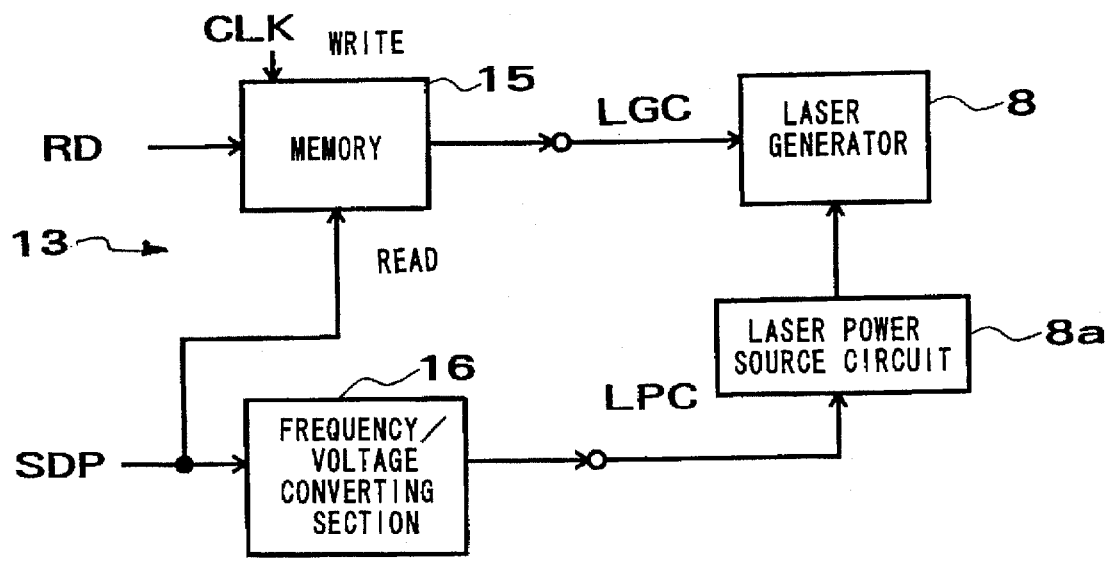
F I G. 4
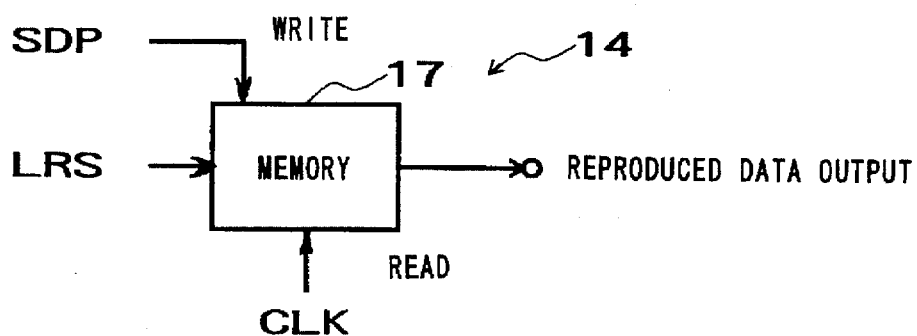
F I G. 5

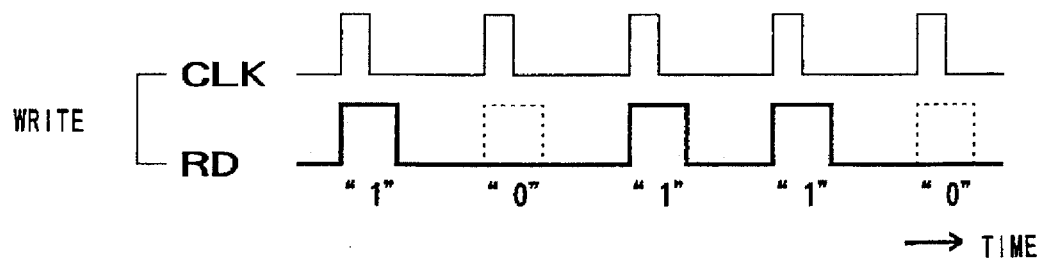
F I G. 6A
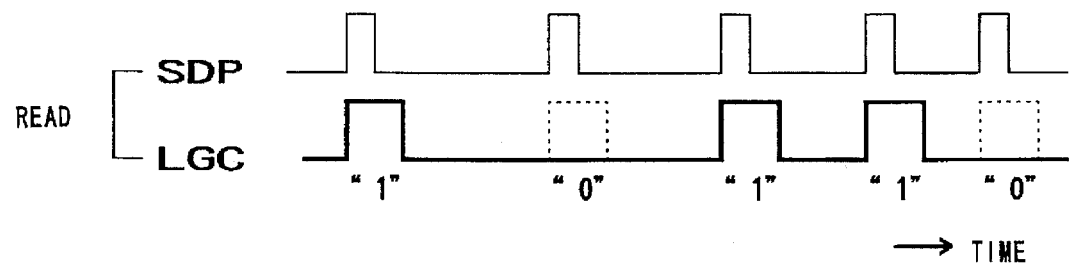
F I G. 6B
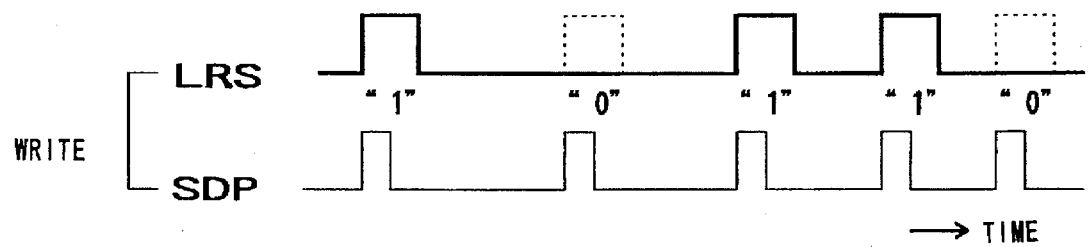
F I G. 7A
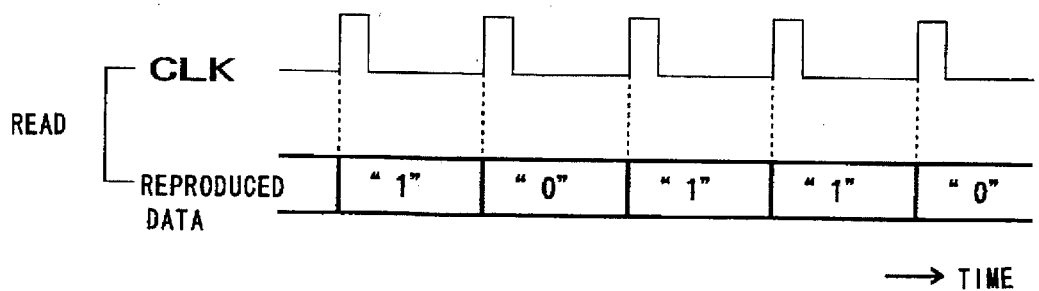
F I G. 7B

METHOD OF AND APPARATUS FOR RECORDING AND REPRODUCING OPTICAL INFORMATION

BACKGROUND OF THE INVENTION

The present invention relates to a method of and apparatus for recording and reproducing optical information onto and from an optical information recording medium by moving, relative to the medium, an optical head projecting recording and reproducing light beams onto the medium. More particularly, the present invention relates to an optical information recording/reproducing method and apparatus which use a card-type recording medium having a plurality of parallel recording tracks formed thereon and which record and reproduce optical information by reciprocating the recording medium and an optical head relative to each other.

Today, in most of optical information recording and reproducing apparatuses which record and reproduce optical information by reciprocating an optical head relative to a recording medium, there are used a removable card-type recording medium which is commonly known as an optical card. A typical form of the information recording area of such a known optical card 1 is schematically shown in FIG. 2B. As shown by parallel horizontal lines in the figure, a multiplicity of recording tracks are provided in parallel on the information recording area 2b. More specifically, a guide track is interposed between adjacent recording tracks as well known in the art. When recording or reproducing information onto or from the optical card 1, an optical head is positioned to project a reproducing or reproducing light beam onto a desired recording track, and the optical head and optical card 1 are linearly moved relative to each other along that recording track. In such a case, a conventionally-known recording/reproducing control method, as typically disclosed in Japanese Patent Publication No. HEI 5-3662, controls the speed of the relative movement between the optical head and optical card 1 to be constant while the optical head 1 is being located within the information recording area 2b, so as to allow data pits to be formed or recorded at uniform intervals and also facilitate reproduction of thus-formed data pits. When the optical head is in an outside area 3b beyond the information recording area 2b, the control method accelerates or decelerates the relative movement and also reverses the direction of the relative movement. Namely, as shown in FIG. 1B, the relationship between the distance and speed of the relative movement between the optical head and optical card 1 presents a speed characteristic curve having an accelerated speed region A, a constant speed region C and a decelerated speed region D, and the constant speed region C occupies the greatest proportion in correspondence with the information recording area 2b.

In the optical information recording and reproducing apparatuses using such an optical card, the size and interval (recording pitch) of data pits to be formed in the optical card are in general standardized: for example, the standardized diameter of each pit is in the order of 2.5 µm and the standardized interval (recording pitch) between pits is in the order of 5 µm. It is desirable in such optical information recording and reproducing apparatuses that the data transfer speed (amount of data that can be recorded or reproduced per unit time) be increased as much as possible. However, in order to increase the data transfer speed in recording data pits at uniform intervals (recording pitches) or reproducing the thus-formed data pits, it is necessary to increase the relative movement speed between the optical card and optical head during recording or reproduction and also minimize a time required for the reversal of the relative movement direction. To this end, it was necessary in the prior art to increase the seed of the relative movement in the constant speed region C (information recording area 2b), as well as to reduce the time taken in the accelerated and decelerated speed regions A and D. This would require a rapid acceleration and deceleration of the relative movement in the outside areas 3b.

However, the prior art apparatuses have many defects because the rapid acceleration and deceleration of the relative movement would require a more powerful and hence larger-size driving system and consume more electric power. Further, the prior art apparatuses are also disadvantageous in that the outside areas must have a considerable size for permitting not only the direction reversal but also the acceleration and deceleration, and as a result the information recording area 2b must undesirably be narrowed to a considerable degree.

SUMMARY OF THE INVENTION

It is therefore an object of the present invention to provide a method of and apparatus for recording and reproducing optical information, which eliminate the need for rapid acceleration and deceleration of a relative movement between an optical head and optical card to thereby minimize the size of a driving system and necessary power consumption, and which also allows an information recording area of the card to be increased in size and yet can substantially increase a data transfer speed.

In order to accomplish the above-mentioned object, the present invention provides a method of recording and reproducing optical information where an optical information recording medium and an optical head are reciprocatingly moved relative to each other in a direction along a recording track formed on the recording medium to thereby execute information recording and reproduction onto and from the recording track by means of the optical head, and which is characterized in that it comprises a step of varying a speed of relative movement between the information recording medium and optical head in such a manner that the relative movement is accelerated and thereafter decelerated in the course of the relative movement, a step of detecting the speed of the relative movement between the information recording medium and optical head, a step of, in response to variation in the speed of the relative movement, controlling generation timing and intensity of a light beam to be generated by the optical head in correspondence with information to be recorded, in order to record information onto the recording track during the relative movement involving acceleration and deceleration effected by the step of varying, and a step of setting reproduction timing of data read by the optical head in synchronism with variation in the speed of the relative movement in order to reproduce information from the recording track during the relative movement involving acceleration and deceleration effected by the step of varying.

The present invention may be embodied as a method of or apparatus for performing only one of information recording and reproduction.

Namely, a method of recording optical information according to the present invention is characterized by the step of, in response to variation in the speed of the relative movement, controlling generation timing of a light beam to be generated by the optical head in correspondence with information to be recorded, and thereby making uniform a pitch of data pits to be formed in the recording track.

Further, a method of recording optical information according to the present invention is characterized by the step of setting reproduction timing of data read by the optical head in synchronism with variation in the speed of the relative movement.

The present invention also provides an apparatus for recording and reproducing optical information which comprises a removable optical information recording medium having a plurality of recording tracks thereon, an optical head for executing at least either of information recording and reproduction onto and from any of the recording tracks, a transfer section for moving the recording medium and optical head relative to each other in a direction along the recording track, a detection section for detecting a speed of relative movement between the information recording medium and optical head, and a reproduction control section for setting reproduction timing of data read by the optical head in synchronism with variation in the speed of the relative movement in order to reproduce information from the recording track during the relative movement involving acceleration and deceleration effected by the transfer section.

Further, an apparatus for recording and reproducing optical information according to the present invention is characterized by the provision of a recording control section for, in response to variation in the speed of the relative movement, controlling generation timing and intensity of a light beam to be generated by the optical head in correspondence with information to be recorded, in order to record information onto the recording track during the relative movement involving acceleration and deceleration by the transfer section.

Furthermore, the present invention provides an apparatus for recording and reproducing optical information which comprises an optical information recording medium, an optical head and a transfer section for moving the recording medium and optical head relative to each other in a direction along a recording track formed on the recording medium, the optical head executing at least either of information recording and reproduction onto and from a recording track, and which is characterized by the provision of a transfer control section for controlling the transfer section in such a manner that when the optical head is within a recording or reproducing area of the recording medium, the relative movement between the information recording medium and optical head presents an optional variable speed characteristic involving acceleration and deceleration and also that a direction of the relative movement is reversed when the optical head is outside the recording or reproducing area.

In recording information onto the recording medium during the relative movement involving acceleration and deceleration, if recording data are supplied to the optical head at constant timing as in the prior art, the pitch of information data pits recorded in the recording medium becomes ununiform and also the intensity of projected light energy for forming such data pits becomes ununiform, due to a varying speed of the relative movement of the recording medium to the optical head. Namely, the data pit pitch becomes coarser as the relative movement speed increases and becomes finer as the relative movement speed decreases. The size of the recorded data pits depends on a total energy amount proportional to duration of the light beam projection onto the recording medium; that is, the size becomes smaller as the relative movement speed increases and becomes greater as the relative movement speed decreases. Such ununiformity in the data pit pitch and size is undesirable because no standardized recording is attained. This is the reason why recording and reproduction had to be performed only on the constant speed region in the prior art.

In contrast, the present invention is arranged to avoid the inconveniences of the prior art by the arrangement that the generation timing and intensity (power) of the light beam to be generated by the optical head in correspondence with information to be recorded are controlled in response to variation in the speed of the relative movement of the recording medium to the optical head. Namely, by controlling the generation timing of the light beam in response to the relative movement variation, it is possible to uniformize the pitch of data pits formed in the recording track. That is, data pits can be formed at a standardized uniform pitch by increasing the generation rate of the light beam (i.e., generation speed of the recording data) as the relative movement speed gets faster and decreasing the generation rate of the light beam as the relative movement speed gets slower. Also, by controlling the intensity (power) of the light beam in response to variation of the relative movement speed, data pits formed in the recording track can be uniform in size. That is, by adjusting the light beam intensity depending on the duration of the light beam projection in such a manner that the intensity decreases as the relative movement speed gets slower, the total light energy for forming each individual data pit can be made substantially constant, which permits formation of data pits having a standardized size.

The recording method or apparatus of the present invention can record data pits at a standardized uniform pitch and size even when the relative movement of the recording medium to the optical head varies in speed, by performing proper control responsive to variation of the relative movement speed as mentioned. Therefore, it is allowed to positively execute information recording in the accelerating and decelerating regions. For example, as shown in FIG. 1A, the speed characteristic of the relative movement between the recording medium and optical head can be set such that the movement is accelerated until a virtual middle position in a movement stroke and decelerated after the middle position (this can be called a "chevron-shaped speed variation"). For comparative reference, the speed characteristic curve in the prior art shown in FIG. 1B is added to the figure in dotted line. As will be apparent from the comparison between the solid-line characteristic (an example characteristic according to the present invention) and the dotted-line characteristic (prior art), the accelerated and decelerated speed regions in each stroke can be made relatively long with the solid-line characteristic (an example according to the present invention), whereas such regions are relatively short with the dotted-line characteristic (prior art), so that the acceleration and deceleration curve with the solid-line characteristic can be made gentler than that with the dotted-line characteristic. This indicates that a small-size driving system may be employed in the present invention, which will advantageously achieve substantial reduction in electric power consumption and size and cost of the apparatus. Further, because the accelerated and decelerated speed regions can also be used as part of the recording area in the present invention, the recording area 2a, as shown in FIG. 2A, can be made far greater than in the prior art example (such as shown in FIG. 2B). In such a case, only reversal of the movement direction has to be conducted in the outside areas 3a beyond the recording area 2a, the outside areas 3a may have a narrow size, and the time required for the reversal can be reduced. In addition, since the maximum speed of the relative movement can be made greater than in the prior art, the present invention can advantageously reduce the total time necessary for a single stroke of the relative movement, with the result that the data transfer speed can be increased to a substantial degree.

The information recorded by the recording method and apparatus in accordance with the present invention is in a standardized form, and hence a reproducing technique intended for only the constant-speed region as that in the prior art may be used for reproducing the recorded information. Further, the information recorded by the recording method and apparatus of the present invention does not necessarily have to be in a standardized form, and instead recording control may be applied such that the information is recorded in any specific form as necessary.

The present invention also provides a method or apparatus which can accurately reproduce the recorded information even during the relative movement involving acceleration and deceleration. Namely, the reproducing method of the present invention is characterized in that timing to reproduce data read by the optical head is set in synchronism with variation in the relative movement speed. In the case where data pits recorded on the recording medium are in a standardized form, the inter-data time interval in the data train to be reproduced would become ununiform in response to varying relative movement speed if they are reproduced during the relative movement involving acceleration and deceleration. A train of such ununiformly reproduced data is practically unutilizable. However, according to the present invention where the data reproduction timing is set in synchronism with variation in the relative movement speed, it is possible to obtain ununiformity-free reproduced data even when the inter-data time interval in the data train to be reproduced is ununiform, because each current speed corresponds to the ununiformity.

Such setting of the reproduction timing may be realized by, for example, providing a memory to stored data read by the optical head and variably controlling at least one of the write clock rate or read clock rate for the memory in response to variation in the relative movement speed. For instance, the use of a variable write clock rate responding to the relative movement speed variation can store the read data into the memory at accurate timing that varies in response to the speed variation, even where the data to be reproduced are ununiform in time interval due to the speed variation. Consequently, accurate reproduced data can be stored in the memory. The reproduced data thus stored in the memory may be read out in accordance with regular read clock pulses so as to output a reproduced data train in which the inter-data time intervals are uniform in correspondence with the pitch of the data pits, or may be read out for reference when necessary.

Further, the setting of the data reproduction timing synchronous with the relative movement speed may be implemented in such a manner that a train of speed detection pulses is output, as a train of synchronizing pulses, in parallel with the data train to be reproduced. In such a case, an apparatus utilizing the reproduced data train may utilize the reproduced data by means of an appropriate arrangement for, for example, latching or buffering the reproduced data in accordance with the synchronizing pulses.

As mentioned, even when the relative movement of the recording medium to the optical head varies in speed, the reproducing method and apparatus of the present invention can obtain reproduced data that can be properly utilized without causing any inconveniences, by setting the data reproduction timing in synchronism with the speed variation. Thus, just as in the recording, it is allowed to positively execute information reproduction in the accelerated and decelerated speed regions, and also the relative movement between the recording medium and optical head can present a characteristic curve as shown by the solid line in FIG. 1A. Therefore, in the reproduction, the present invention achieves advantageous results similar to those attained in the recording.

As apparent from the foregoing, the present invention may be embodied in only one of the optical information recording and reproduction, in which case the other of the optical information recording and reproduction may be carried out in accordance with the conventional technique. Namely, optical information recorded on a recording medium (optical card) by the conventional technique may be reproduced by use of the method or apparatus of the present invention, or vice versa (i.e., optical information recorded on a recording medium by the method or apparatus of the present invention may be reproduced by use of the conventional technique). Thus, compatibility can be maintained between the present invention and the conventional technique in recording and reproducing a recording medium (optical card). In the case where the optical information recording of the present invention is conducted in consideration of compatibility with the conventional technique, it is of course necessary to set a narrow information recording area like the one ($2b$ in FIG. 2B) as required by the conventional technique. Of course, optical information recorded on the recording medium (optical card) by the method or apparatus of the present invention may be reproduced by use of the method or apparatus of the present invention. In such a case, a wider information recording area will be set as shown by $2a$ in FIG. 2A and the pitch and size of data pits may not necessarily have to be standardized. Also, the present invention may be modified to tolerate a certain degree of variation in the data pit diameter with data pits recorded at a standardized pitch.

BRIEF DESCRIPTION OF THE DRAWINGS

For better understanding of various features of the present invention, the preferred embodiments of the invention will be described in detail hereinbelow with reference to the accompanying drawings, in which:

FIG. 4 is a block diagram showing an exemplary detailed structure of a recording control section shown in FIG. 3;

FIG. 5 is a block diagram showing an exemplary detailed structure of a reproduction control section shown in FIG. 3;

FIGS. 6A and 6B are timing charts showing an exemplary operation of the recording control section of FIG. 4;

FIGS. 7A and 7B are timing charts showing an exemplary operation of the reproduction control section of FIG. 4.

DETAILED DESCRIPTION OF THE PREFERRED EMBODIMENTS

Figure 3:
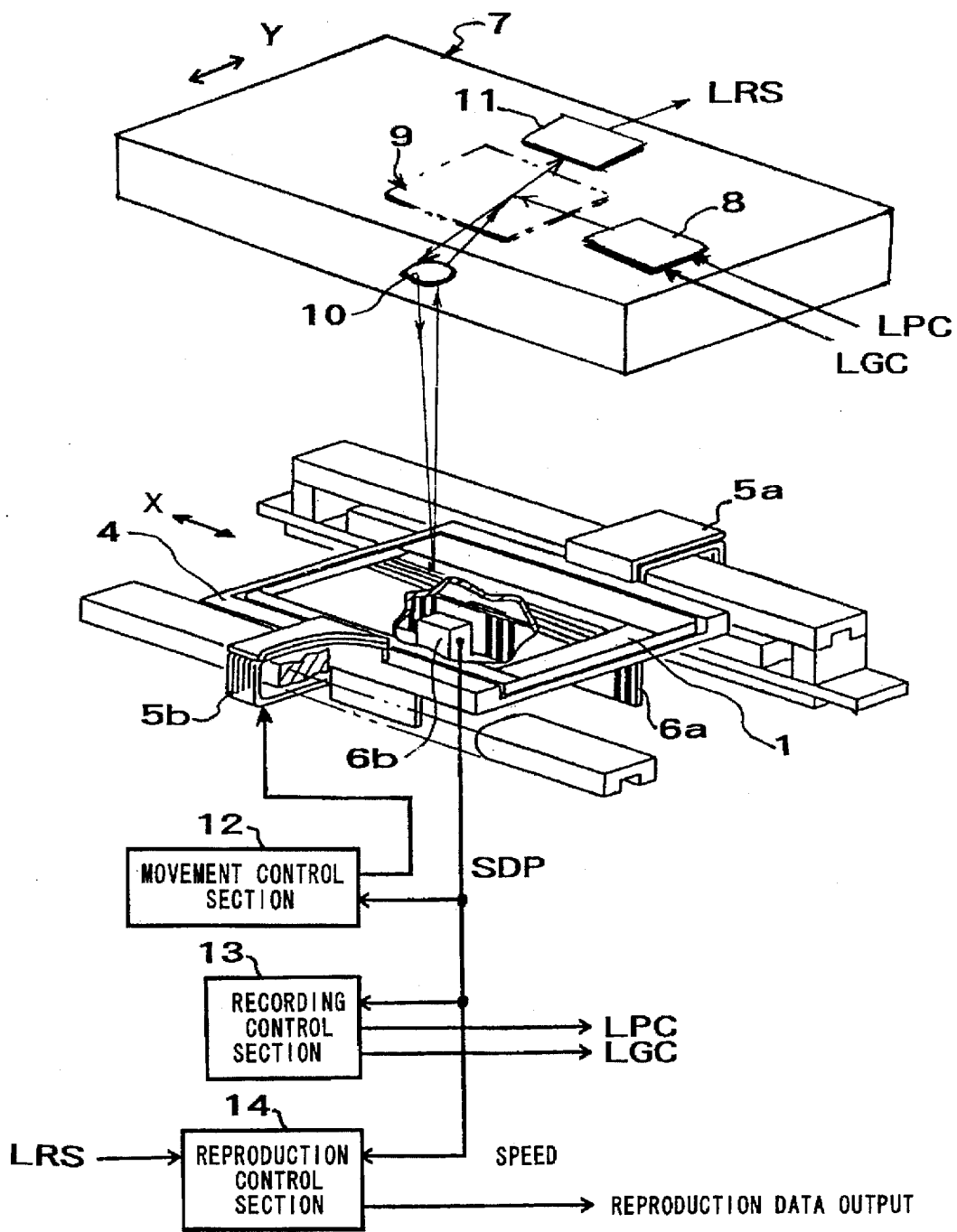
FIG. 3 is a view, partly cut away, of an optical information recording and reproducing apparatus in accordance with an embodiment of the present invention.

FIG. 3 is a view, partly cut away, of an optical information recording and reproducing apparatus in accordance with an embodiment of the present invention. An optical card 1, which is a removable recording medium, is inserted through a predetermined inlet opening (not shown) to be placed on a transfer table 4. The transfer table 4 is driven, via a pair of left and right linear motors 5a and 5b of the movable coil type, to reciprocate in the X direction (i.e., a direction along the recording tracks of the optical card 1 placed on the transfer table 4). An optical head 7 is provided above such an X-direction transport mechanism for the optical card 1. This optical head 7 is fixed against movement in the X direction, and the optical card 1 is caused to reciprocatingly move relative to the optical head 7 in the direction along the recording tracks as the transfer table 4 with the card 1 placed thereon is driven in the X direction. Further, the optical head 7 is moved, via a Y-direction drive mechanism, in the Y direction (i.e., a direction transverse to the recording tracks of the optical card 1 placed on the transfer table 4). The transfer table 4 is fixed against movement in the Y direction, and the optical card 7 is caused to move relative to the optical card 1 in the direction transverse to the recording tracks.

The optical head 7 includes a laser generator 8 for generating laser light, an optical system 9 for processing the laser light generated by the generator 8, an objective lens 10 for projecting the laser light processed by the optical system 9 onto the recording surface of the optical card 1 placed on the transfer table 4 and also converging reflection from the recording surface of the projected laser light, and a light receiving device 11 for receiving the reflected light converged by the objective lens 10 to convert it into an electric signal.

The mechanism for reciprocating the optical card 1 relative to the optical head 7 in the X direction, and the optical head 7 may be constructed in any known or unknown manner other than shown in the figures.

A linear encoder comprised of a linear scale 6a and a sensor 6b is provided for detecting a moving position and speed of the transfer table 4. As shown in FIG. 3 by cutting away the middle portions of the optical card 1 and transfer table 4, this embodiment has the linear encoder mounted on the underside of the transfer table 4. For example, the linear scale 6a of the encoder is fixed to the underside of the transfer table 4 so as to move along with the transfer table 4 in the X direction, and the sensor 6b is fixed to a base frame. This linear encoder may for example be an optical linear encoder which is comprised of an optical sensor 6b and a linear scale 6a having a row of multiple optical slits formed at predetermined minute intervals in such a manner to output an incremental pulse signal each time the transfer table 4 moves a predetermined minute distance. As well known, the number of the incremental pulses corresponds to a distance of the table's movement or displacement, and the pulse interval corresponds to a speed of the table's movement (specifically, it is proportional to the reciprocal of the speed). As such an optical linear encoder may be employed one which applies the principle of Michelson interferometer. A magnetic or induction-type linear encoder may be used in place of the optical type, or an encoder of the absolute position detecting type (digital or analog) may of course be used in place of the incremental pulse generating linear encoder. In this embodiment, because the generating time interval of the incremental pulses directly corresponds to the speed of the table's movement, the incremental pulses output from the encoder may be frequency-divided, directly or in any other suitable fashion, for use as speed detection pulses SDP. In practice, the speed detection pulses SDP obtained by frequency-dividing the incremental pulses output from the encoder at an appropriate division ratio are used in later-described recording/reproduction control, because the incremental pulses are of very high resolution although no such high resolution is actually required for the recording/reproduction control. However, no frequency-dividing circuit to be used for that purpose is shown in this application, and the speed detection pulses are denoted by a same reference character SDP irrespective of whether they are frequency-divided or not.

Figure 1A:
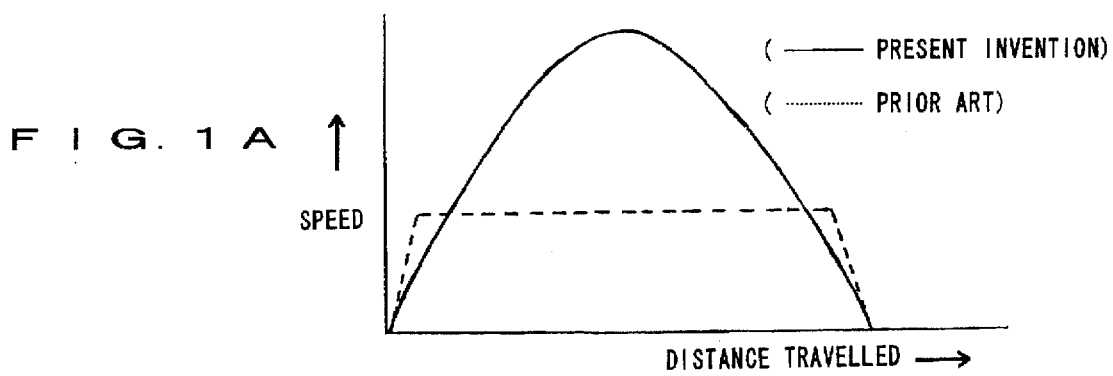
FIG. 1A is a graph showing an example of a speed characteristic of relative movement of an optical card to an optical head according to the present invention.
Figure 1B:
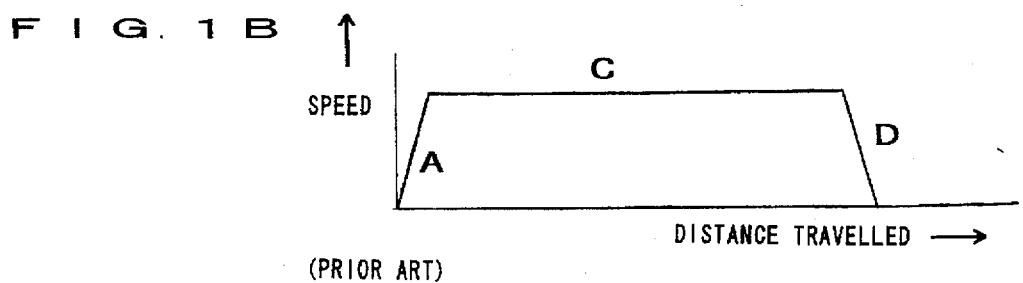
FIG. 1B is a graph showing an example of a speed characteristic of relative movement of an optical card to an optical head according to a conventionally known technique.
Figure 2A:
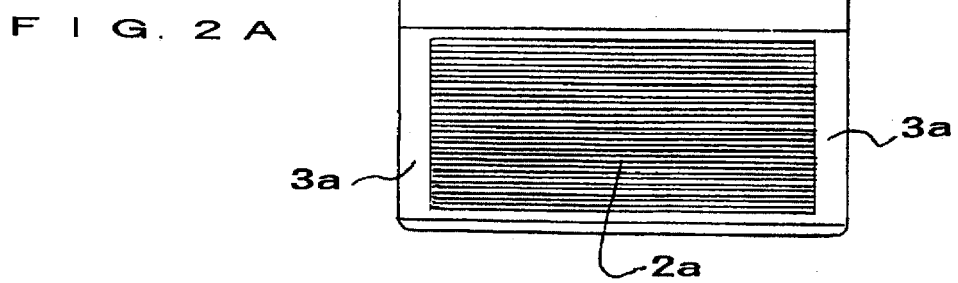
FIG. 2A is a schematic plan view showing an example of an information recording area of an optical card according to the present invention.
Figure 2B:
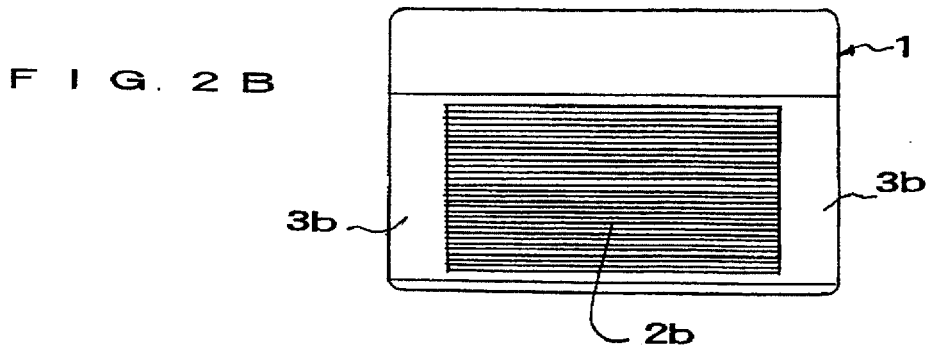
FIG. 2B is a schematic plan view showing an example of an information recording area of an optical card according to a conventionally known technique.

A movement control section 12 controls the operation of the linear motors 5a and 5b to reciprocate in the X direction the transfer table 4 with the optical card 1 placed thereon. Namely, the movement control section 12 controls one stroke (outward or return stroke) of the transfer table 4 in the X direction in accordance with a variable speed characteristic curve including optional acceleration and deceleration regions as shown by the solid line in FIG. 1A, effects reversal of the moving direction of the transfer table 4, and then controls the other stroke (return or outward stroke) of the transfer table 4 in the X direction in accordance with the variable speed characteristic. Of course, the variable speed characteristic may be other than shown in FIG. 1A and may partly include a constant speed region. That is, an essential feature of the present invention resides in its capability to perform recording or reproduction even in the accelerated speed region or decelerated speed region, and therefore, the variable speed characteristic may partly include such a constant speed region. In such a case, it is of course possible to perform recording or reproduction in the constant speed region as in the prior art.

A recording control section 13 receives the speed detection pulses SDP output from the linear encoder 6a, 6b and thus, in response to variation in the relative movement speed in the X direction, controls the generation timing and intensity (power) of a light beam to be generated from the optical head 7 in correspondence with information to be recorded. As the result of such control, the recording control section 13 outputs a laser generation control signal LGC and laser power control signal LPC to the laser generator 8 of the optical head 7.

Further, a reproduction control section 14 receives the speed detection pulses SDP output from the linear encoder 6a, 6b and a light reception signal LRS output from the light receiving device 11 of the optical head 7 and thus, in synchronism with variation in the relative movement speed in the X direction, sets reproduction timing of data read by the optical head 7.

FIG. 4 shows an exemplary detailed structure of the recording control section 13. Recording data RD, which are given from a to-be-recorded information generating section (not shown), provide, in the form of a series of one bit data, information to be recorded on one of the recording tracks. More specifically, as shown in FIG. 6A, this recording data RD assume a logical value of "1" or "0" at each predetermined time interval corresponding to clock pulses having a constant period. In the conventionally-known recording technique, the serial recording data RD having a value "1" or "0" at each predetermined time interval were directly used as ON/OFF instruction signals to the laser generator. In contrast, the embodiment of the present invention stores the recording data RD in a memory 15 in stead of directly using them as ON/OFF instruction signals to the laser generator 8. By using the above-mentioned clock pulses CLK as write control clock pulses to the memory 15, necessary serial recording data RD can be received and stored with reliability. Then, the recording data (RD) written in the memory 15 are read out in sequence, using as read control clock pulses the above-mentioned speed detection pulses SDP output from the linear encoder 6a, 6b. Each read-out output from the memory 15 is supplied, as the laser generation control signal LGC, to the laser generator 8 of the optical head 7. Thus, depending on presence or absence of a pulse (value of "1" or "0") in the supplied laser generation control signal LGC, the laser generator 8 turns ON or OFF generation of laser light.

For instance, during the acceleration, the pulse generating time interval of the speed detection pulses SDP becomes progressively shorter as shown in FIG. 6B, and correspondingly, readout timing (readout rate) of the recording data from the memory 15 becomes progressively higher so that the laser generation control signals LGC are output at data generation timing corresponding to the varying speed. During the deceleration as well, the laser generation control signals LGC are output at data generation timing corresponding to the varying speed in a similar manner to the above-mentioned, although the variations of the signals take place in the reversed form. Consequently, the light beam generating timing (recording data generating rate) becomes faster as the speed of the relative movement in the X direction of the optical card 1 to the optical head 7 becomes higher, whereas the light beam generating timing (recording data generating rate) becomes slower as the speed of the relative movement in the X direction of the optical card 1 to the optical head 7 becomes lower. In this manner, data pits can be formed on the optical card 1 at a standardized uniform pitch.

The write and read of the recording data RD into and from the memory 15 may be conducted simultaneously in a parallel fashion. Alternatively, the data for one or more tracks may first be written into the memory 15 when the optical card 1 is at rest, and then the data readout from the memory 15 may be conducted after the relative movement is initiated. In another alternative, recording data prestored in the memory 15 may be read out at a readout rate varying with the relative speed. In the case where the write and read of the recording data RD are conducted simultaneously in a parallel fashion, a FIFO-type buffer memory or register may be used as the memory 15. It should be obvious that in any of the cases, control to start readout of one-track data from the memory 15 is performed synchronously with the time when the relative position between the optical head 7 and optical card 1 has reached a predetermined recording start point along the track in question.

In FIG. 4, a frequency/voltage converting section 16 receives the speed detection pulses SDP from the linear encoder 6a, 6b to output an analog voltage signal corresponding to the generation frequency of the pulses (corresponding to the speed). This speed-corresponding analog voltage signal is supplied, as the laser power control signal LPC, to a laser power source circuit 8a attached to the laser generator 8 of the optical head 7. The laser power source circuit 8a supplies electric power to the laser generator 8 and variably controls the power in accordance with the analog value of the laser power control signal LPC to thereby variably control the intensity (power) of the laser light to be generated by the laser generator 8.

For example, as the speed of the relative movement of the optical card 1 to the optical head 7 increases, the generation frequency (rate) of the speed detection pulse SDP increases, and thus the voltage value of the laser power control signal LPC becomes greater so that the intensity of the laser light to be generated from the laser generator 8 increases. Conversely, as the speed of the relative movement decreases, the generation frequency (rate) of the speed detection pulse SDP decreases, and thus the voltage value of the laser power control signal LPC becomes smaller so that the intensity of the laser light to be generated from the laser generator 8 decreases. When the relative movement speed increases, a projecting time (duration) of a light beam spot on a specific point of the optical card 1 becomes shorter, so that the diameter of a pit formed in the specific point could undesirably become small. Conversely, when the relative movement speed decreases, a projecting time of a light beam spot on a specific point of the optical card 1 becomes longer, so that the diameter of a pit formed in the specific point could undesirably become great.

By increasing the laser light beam intensity as the relative movement speed increases as noted above, this embodiment can prevent the pit formed in the specific point from becoming small in diameter. Also, by decreasing the laser light beam intensity as the relative movement speed decreases, this embodiment can prevent the pit formed in the specific point from becoming great in diameter. Thus, with the present invention, it is allowed to form pits of substantially uniform, standardized size.

Whereas the frequency/voltage converting section 16 has been described as outputting an analog voltage corresponding to the generation frequency of the speed detection pulses SDP, the section 16 may output a digital signal corresponding to the generation frequency of the speed detection pulses SDP. In addition, the variation characteristic of the light beam intensity responding to the varying relative movement speed may be either a linear function characteristic according to an appropriately-set proportionality constant or a nonlinear function characteristic. For example, the light beam intensity may be variably controlled only when the relative movement speed exceeds a predetermined limit, rather than being always variably controlled while the relative movement speed is within a predetermined range. In such a case, a data converting table based on an appropriate conversion function may be used in place of or in addition to the frequency/voltage converting section 16. Further, the variable control of the light beam intensity responding to the varying relative movement speed may be performed in a plurality of steps rather than in a continuous manner. Furthermore, in such applications where some variation in the data pit diameter can be tolerated, the variable control of the light beam intensity responding to the varying relative movement speed may be completely omitted.

FIG. 5 shows an exemplary detailed structure of the reproduction control section 14. This reproduction control section 14 includes a readable/writable memory 17, to which the light reception signal LRS is supplied from the light receiving device 11 of the optical head 7 during reproduction. As write control clock pulse signals to the memory 17 are used the speed detection pulses SDP output from the linear encoder 6a, 6b (signals obtained by appropriately frequency-dividing the pulses DSP). As shown in FIG. 7A, the light reception signal LRS comprises a data pulse train indicating a logical value "1" or "0" depending on presence or absence of a data pit recorded on the recording track of the optical card 1. The data pulse train of the light reception signal LRS represents pulse time intervals varying in response to variation in the relative movement speed. Thus, as shown in FIG. 7A, data of the light reception signal LRS read from the individual data pit positions of the optical card 1 (i.e., data each indicating a logical value "1" or "0" depending on presence or absence of a data pit) can be reliably stored into the memory 17 in sequence, by performing the storing of the data in synchronism of the speed detection pulse SDP generated as the relative movement speed is detected. In such a case, jitter components can also be eliminated reliably.

In the above-mentioned manner, accurate reproduced data read from predetermined data pit positions are stored into the memory 17 irrespective of the varying speed of the relative movement of the optical card 1 to the optical head 7. Reproduced data of a plurality of the recording tracks may be stored into the memory 17 so that the reproduced data of any necessary recording track are read out from the memory 17 at random when necessary. In such a case, the memory 17 may be a random access memory. Alternatively, the memory 17 may be used as a mere buffer, in such a manner that every time reproduced data of one or more recording tracks are stored into the memory 17, these stored data are regularly read out in response to constant-period clock pulses CLK as shown in FIG. 7B and thereby reproduced data arranged at uniform data reproduction timing (data reproduction speed) are sequentially output from the memory 17. Further, the data storage into the memory 17 synchronous with the speed detection pulses SDP and the data readout synchronous with the constant clock pulses CLK may be conducted simultaneously in a parallel fashion. In such a case, the memory 17 may be implemented by a FIFO-type memory or a multi-stage shift register. In the simplest form, the memory 17 may be implemented by a two-stage latch circuit which performs the data storage synchronous with the speed detection pulses SDP and the data readout synchronous with the constant clock pulses CLK. Furthermore, by outputting the data pulse train of the light reception signal LRS and the speed detection pulses SDP in pair and by referring to the speed detection pulses SDP in a rearer-stage application device (not shown), it is also possible to set proper timing for reproducing the data contained in the light reception signal LRS with no need to provide such a memory 17 in the reproduction control section 14. Moreover, as a detour modification not so recommendable, it is also possible to conduct the data storage in synchronism with the constant clock pulses CLK and the data readout in synchronism with the speed detection pulses SDP.

In another modification, the memory 15 in the recording control section 13 and the memory 17 in the reproduction control section 14 may be implemented by a common memory or register. Further, the above-mentioned control sections 12 to 14 may be implemented by a common circuit using a microcomputer.

Figure 8A:
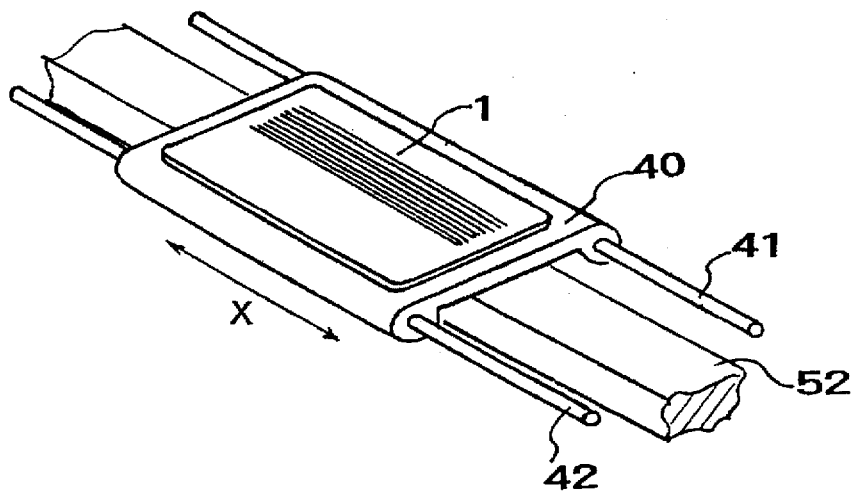
FIG. 8A is an obverse side view of a modified optical card transfer table.
Figure 8B:
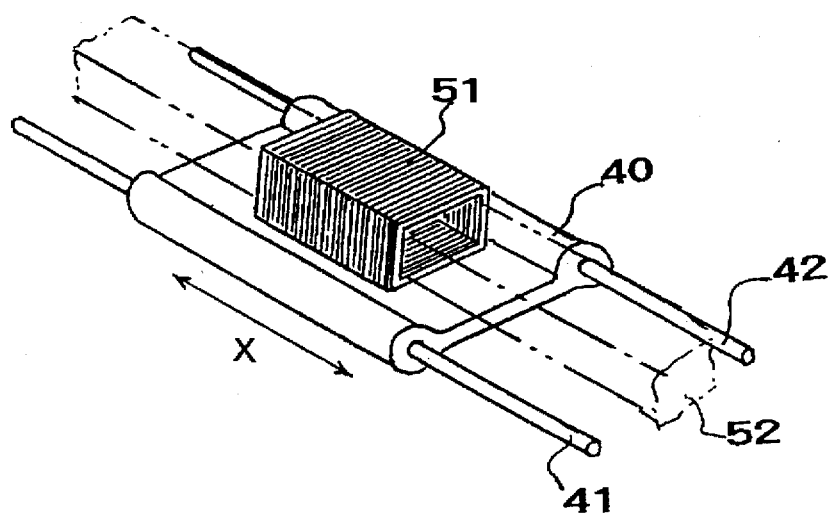
FIG. 8B is a reverse side view of the modified optical card transfer table as shown in FIG. 8A.

Whereas the embodiment of FIG. 3 employs a pair of left and right linear motors 5a and 5b for transferring the optical card 1, only one linear motor may be employed as shown by way of example in FIGS. 8A and 8B. FIG. 8A shows the obverse side of a transfer table 40, while FIG. 8B shows the reverse side of the same. As shown in FIG. 8B, a movable coil 51 of a single linear motor is mounted on the reverse side of the transfer table 40 in such a manner to reciprocatingly move along a fixed portion of the linear motor. Thus, the transfer table 40 reciprocatingly moves while being supported by guide rods 41 and 42. Such guide rods for the table 40 may also be provided in the embodiment of FIG. 3 although not specifically shown in the figure.

In the above-mentioned embodiment, the optical card 1 on which the reproduction process is to be performed may be other than the one processed in accordance with the recording process of the present invention (i.e., the one having an extended (wide) information recording area 2a), such as the one processed in accordance with the conventional recording process (i.e., the one having an unextended (narrow) information recording area). If such an optical card 1 processed in accordance with the recording process of the present invention is to be reproduced by the conventional reproduction process, it is sufficient that the information recording area of the optical card 1 be set to be a narrow area 2b as conventional even where recording is performed on the card in accordance with the recording process of the present invention. Namely, as possible forms of embodiment, the present invention covers not only a case where the recording and reproduction processes are performed simultaneously, but also a case where only one of the recording and reproduction processes is performed at one time.

Although the preferred embodiment of the present invention has been described in connection with a case where the transfer table 4 or 40 having the optical card 1 placed thereon is moved in the X direction, the optical head 7 may of course be moved in the X direction with the transfer table 4 or 40 fixed against movement in the X direction.

In addition, although the present invention has been described in connection with the optical card 1, it is applicable to all other methods or apparatuses which perform recording/reproduction of optical information by relatively reciprocating a recording/reproducing optical head and another type information recording medium than an optical card. Furthermore, the present invention is applicable to other cases where the relative movement between the optical head and the information recording medium is other than reciprocative movement.

As has been described thus far, by performing proper control responsive to variation of the relative movement speed, the present invention can record data pits at a standardized uniform pitch and size and thus perform proper information recording and reproduction in the accelerated and decelerated speed regions. As a result, the present invention achieves the benefits that the accelerated and decelerated speed portions can be made relatively long to thereby attain a relatively gentle acceleration and deceleration characteristic curve, and also that the drive system for the relative movement can be reduced in size and necessary power consumption can be minimized. Further, because the accelerated and decelerated speed regions can also be used as an information recording area, the total information recording area available in the present invention can be greater than in the prior art. Moreover, because the maximum speed of the relative movement can be made greater than that attained in the prior art and also the time taken for reversal of the direction of the relative movement can be reduced to a substantial degree, the present invention can reduce the total time necessary for the reciprocating movement to thereby increase the data transfer speed.

What is claimed is:

1. A method of recording and reproducing optical information where an optical information recording medium and an optical head are reciprocatingly moved relative to each other in a direction along a recording track formed on the recording medium to thereby execute information recording and reproduction onto and from the recording track by means of the optical head, said method comprising the steps of:

varying a speed of relative movement between said information recording medium and optical head in such a manner that the relative movement is accelerated and thereafter decelerated in the course of the relative movement;

detecting the speed of the relative movement between said information recording medium and optical head;

in response to variation in the speed of the relative movement, controlling generation timing and intensity of a light beam to be generated by said optical head in correspondence with information to be recorded, in order to record information onto the recording track during the relative movement involving acceleration and deceleration effected by said step of varying, and setting reproduction timing of data read by said optical head in synchronism with variation in the speed of the relative movement, in order to reproduce information from the recording track during the relative movement involving acceleration and deceleration effected by said step of varying.

2. A method as defined in claim 1 wherein the speed of the relative movement is varied by said step of varying in such a manner that the relative movement is accelerated till arrival at an approximate middle portion in a stroke of the movement and is then decelerated after said approximate middle portion.

3. A method as defined in claim 1 wherein in said step of controlling generation timing, a time interval of recording data to be sequentially generated in correspondence with the information to be recorded is sequentially changed in response to the speed of the relative movement sequentially detected by said step of detecting, so that generation of the light beam is controlled in accordance with the recording data generated at the changed time interval.

4. A method as defined in claim 1 wherein in said step of setting reproduction timing, a memory is used for storing the data read by said optical head, and at least either of a write clock rate and a read clock rate for said memory is controlled in response to variation in the speed of the relative movement.

5. A method as defined in claim 1 wherein in said step of detecting the speed of the relative movement between said information recording medium and optical head, the speed is detected by use of detection means for generating pulse signals at a time interval corresponding to the speed of the relative movement.

6. A method as defined in claim 1 wherein a direction of the relative movement between said information recording medium and optical head is reversed when a light beam projected onto said recording medium gets out of a predetermined information recording area on said recording medium.

7. A method of recording optical information where an optical information recording medium and an optical head are reciprocatingly moved relative to each other in a direction along a recording track formed on the recording medium to thereby execute information recording onto the recording track by means of the optical head, said method comprising the steps of:

detecting a speed of the relative movement between said information recording medium and optical head, and in response to variation in the speed of the relative movement, controlling generation timing of a light beam to be generated by said optical head in correspondence with information to be recorded, and thereby making uniform a pitch of data pits to be formed in the recording track.

8. A method as defined in claim 7 wherein intensity of the light beam to be generated by said optical head in correspondence with information to be recorded is controlled in response to variation in the speed of the relative movement, to thereby allow data pits in the recording track to have a substantially same size irrespective of variation in the speed of the relative movement.

9. A method as defined in claim 7 wherein in said step of controlling generation timing, a time interval of recording data to be sequentially generated in correspondence with the information to be recorded is sequentially changed in response to the speed of the relative movement sequentially detected by said step of detecting, so that generation of the light beam is controlled in accordance with the recording data generated at the changed time interval.

10. A method as defined in claim 7 wherein in said step of detecting the speed of the relative movement between said information recording medium and optical head, the speed is detected by use of detection means for generating pulse signals at a time interval corresponding to the speed of the relative movement.

11. A method as defined in claim 7 wherein a direction of the relative movement between said information recording medium and optical head is reversed when a light beam projected onto said recording medium gets out of a predetermined information recording area on said recording medium.

12. A method of reproducing optical information where an optical information recording medium and an optical head are reciprocatingly moved relative to each other in a direction along a recording track formed on the recording medium to thereby execute information recording onto the recording track by means of the optical head, said method comprising the steps of:

detecting a speed of relative movement between said information recording medium and optical head, and setting reproduction timing of data read by said optical head in synchronism with variation in the speed of the relative movement.

13. A method as defined in claim 12 wherein in said step of setting reproduction timing, a memory is used for storing the data read by said optical head, and at least either of a write clock rate and a read clock rate for said memory is controlled in response to variation in the speed of the relative movement.

14. A method as defined in claim 12 wherein in said step of detecting the speed of the relative movement between said information recording medium and optical head, the speed is detected by use of detection means for generating pulse signals at a time interval corresponding to the speed of the relative movement.

15. A method as defined in claim 12 wherein a direction of the relative movement between said information recording medium and optical head is reversed when a light beam projected onto said recording medium gets out of a predetermined information recording area on said recording medium.

16. An apparatus for recording and reproducing optical information comprising:

a removable optical information recording medium having a plurality of recording tracks thereon;

an optical head for executing at least either of information recording and reproduction onto and from any of the recording tracks;

transfer means for moving said recording medium and optical head relative to each other in a direction along the recording track;

detection means for detecting a speed of relative movement between said information recording medium and optical head, and reproduction control means for setting reproduction timing of data read by said optical head in synchronism with variation in the speed of the relative movement, in order to reproduce information from the recording track during the relative movement involving acceleration and deceleration effected by said transfer means.

17. An apparatus for recording and reproducing optical information as defined in claim 16 which further comprises recording control means for, in response to variation in the speed of the relative movement, controlling generation timing and intensity of a light beam to be generated by said optical head in correspondence with information to be recorded, in order to record information onto the recording track during the relative movement involving acceleration and deceleration by said transfer means.

18. An apparatus for recording and reproducing optical information as defined in claim 17 wherein in response to the speed of the relative movement sequentially detected by said detection means, said recording control means sequentially changes a time interval of recording data to be sequentially generated in correspondence with the information to be recorded, so as to control generation of the light beam in accordance with the recording data generated at the changed time interval.

19. An apparatus for recording and reproducing optical information as defined in claim 16 wherein said reproduction control means includes a memory for storing the data read by said optical head, and means for controlling at least either of a write clock rate and a read clock rate for said memory in response to variation in the speed of the relative movement.

20. An apparatus for recording and reproducing optical information including an optical information recording medium, an optical head and transfer means for moving the recording medium and optical head relative to each other in a direction along a recording track formed on the recording medium, said optical head executing at least either of information recording and reproduction onto and from a recording track, said apparatus comprising transfer control means for controlling said transfer means in such a manner that when said optical head is within a recording or reproducing area of said recording medium, relative movement between said information recording medium and optical head presents an optional variable speed characteristic involving acceleration and deceleration and also that a direction of the relative movement is reversed when said optical head is outside said recording or reproducing area.

21. An apparatus for recording and reproducing optical information as defined in claim 20 which further comprises reproduction control means for setting reproduction timing of data read by said optical head in synchronism with variation in the speed of the relative movement.

22. An apparatus for recording and reproducing optical information as defined in claim 21 wherein said reproduction control means includes a memory for storing the data read by said optical head, and means for controlling at least either of a write clock rate and a read clock rate for said memory in response to variation in the speed of the relative movement.

23. An apparatus for recording and reproducing optical information as defined in claim 20 which further comprises recording control means for, in response to variation in the speed of the relative movement, controlling generation timing and intensity of a light beam to be generated by said optical head in correspondence with information to be recorded.

24. An apparatus for recording and reproducing optical information as defined in claim 23 wherein, in response to the speed of the relative movement, said recording control means changes a time interval of recording data to be generated in correspondence with the information to be recorded, so as to control generation of the light beam in accordance with the recording data generated at the changed time interval.

25. An apparatus for recording and reproducing optical information as defined in claim 24 wherein said recording control means includes a memory storing said recording data, and means for reading out said recording data from said memory at a read rate varying with the speed of the relative movement and executing generation of the light beams in accordance with the read-out recording data.

* * * * *